Sept. 19, 1933.  G. WALTHER  1,927,579
WHEEL COMBINATION FELLOE AND SPACER RING
Original Filed Jan. 21, 1929    3 Sheets-Sheet 1
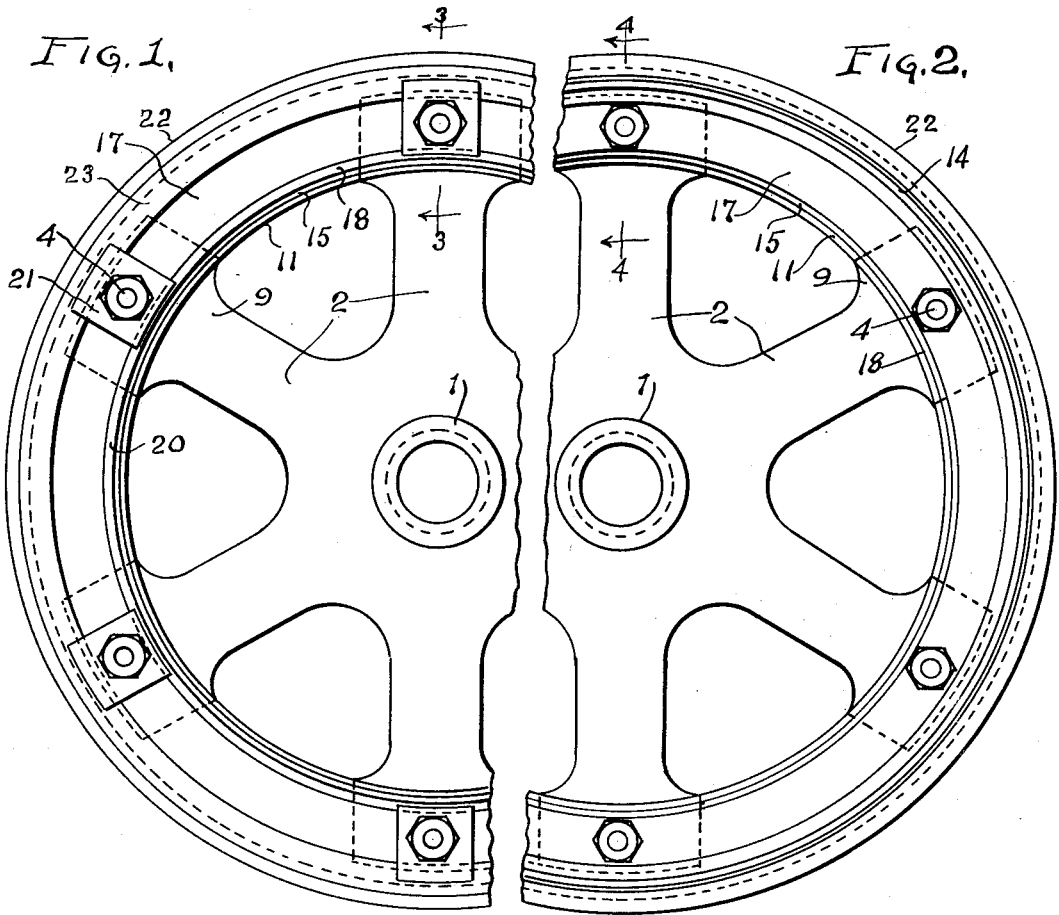
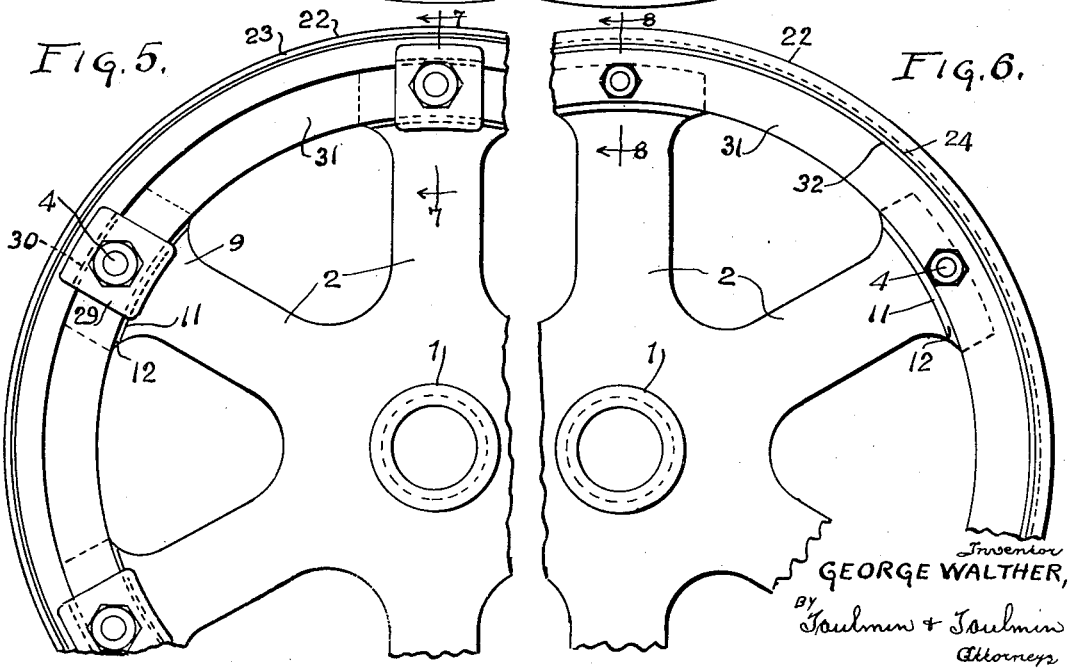

Sept. 19, 1933.　　　　G. WALTHER　　　　1,927,579
WHEEL COMBINATION FELLOE AND SPACER RING
Original Filed Jan. 21, 1929　　3 Sheets-Sheet 2
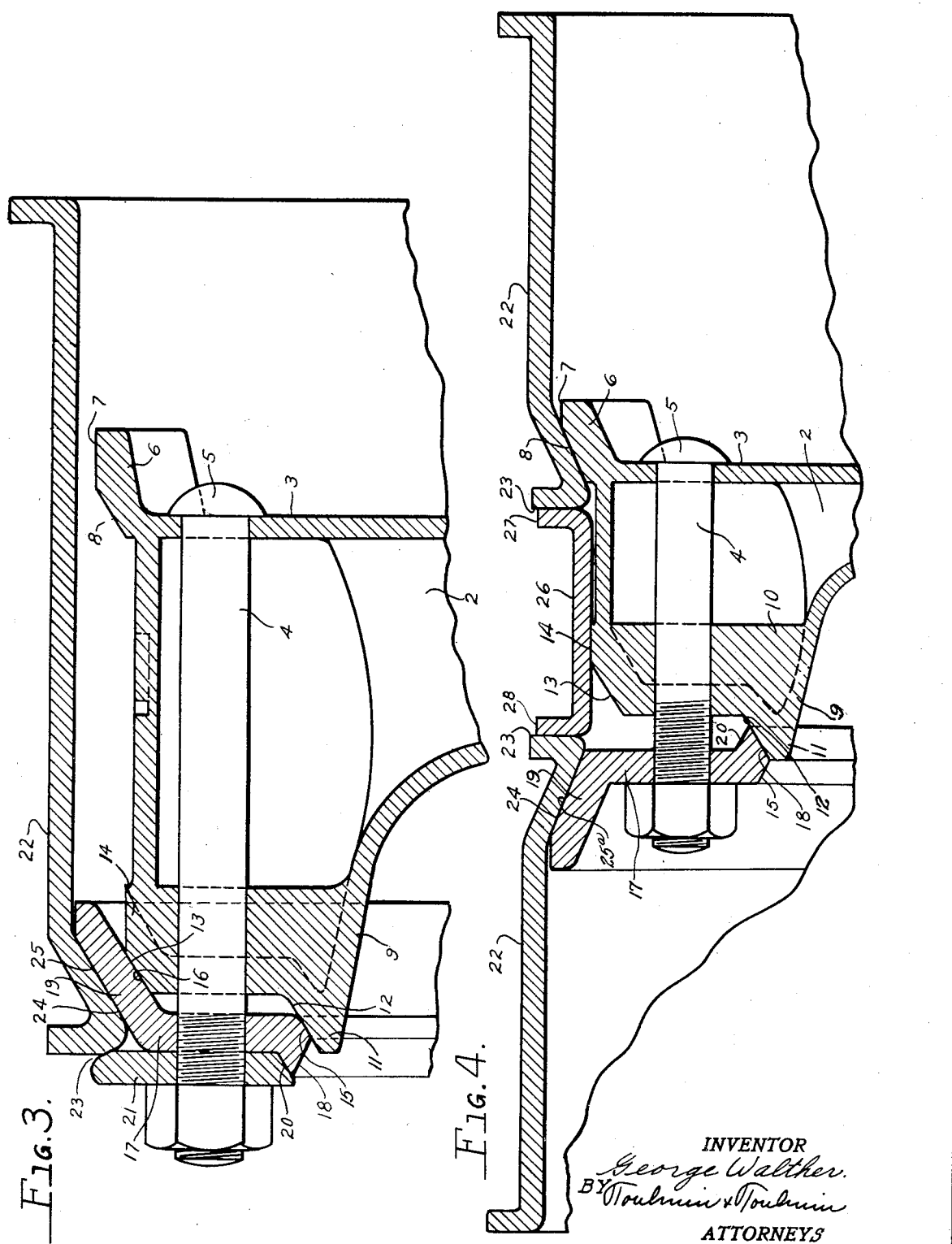
INVENTOR
George Walther.
BY Toulmin & Toulmin
ATTORNEYS Sept. 19, 1933.    G. WALTHER    1,927,579
WHEEL COMBINATION FELLOE AND SPACER RING
Original Filed Jan. 21, 1929    3 Sheets-Sheet 3
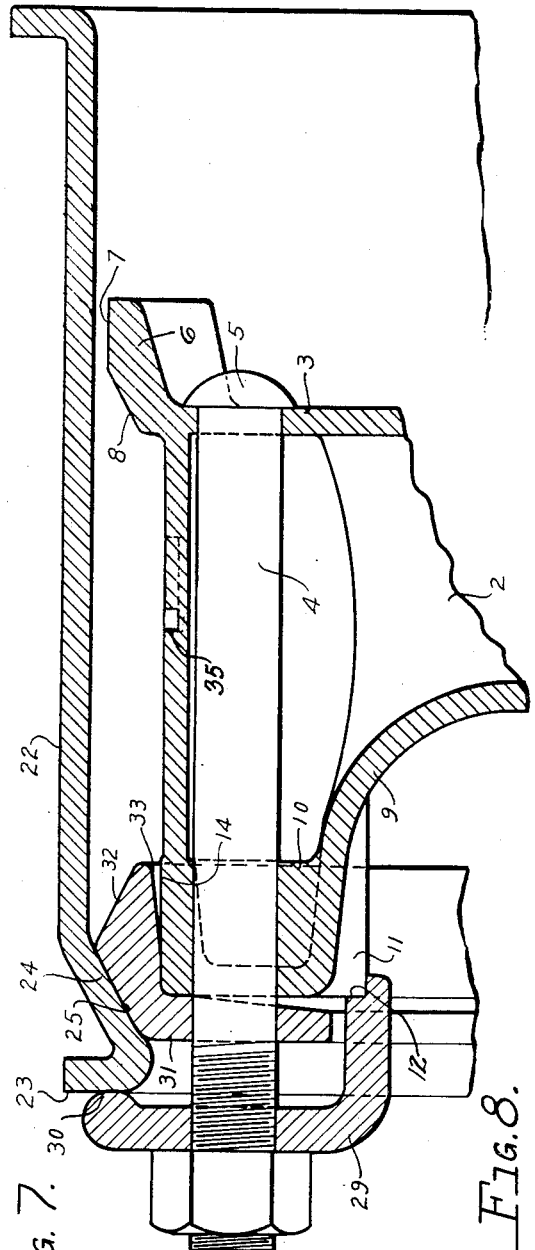
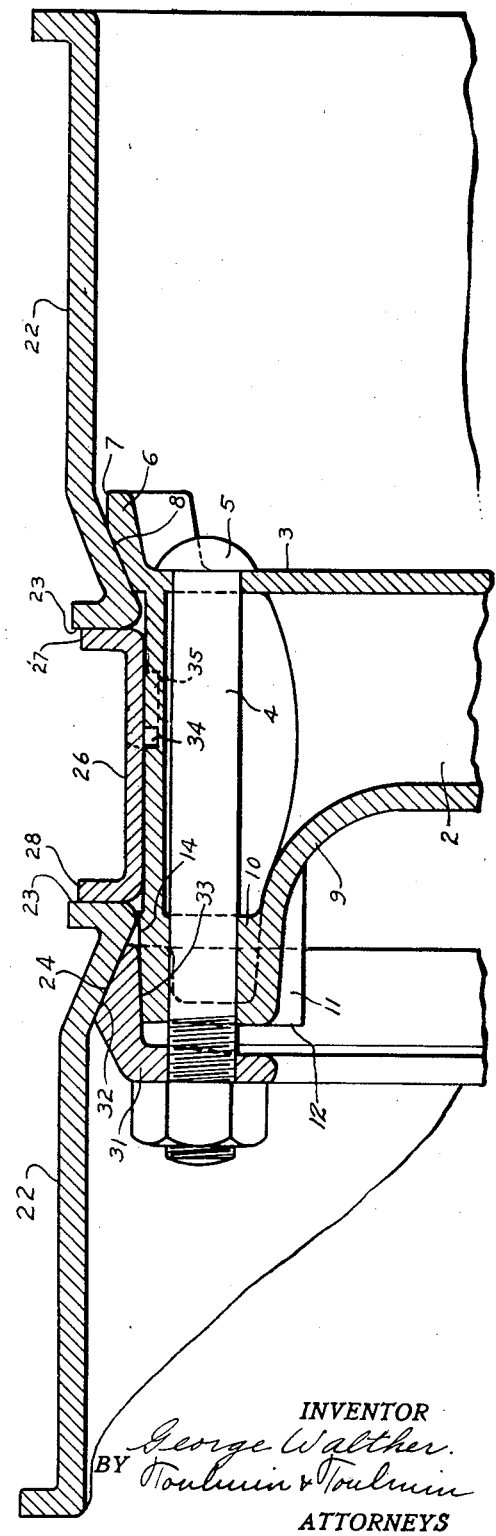
INVENTOR
George Walther.
BY Toulmin & Toulmin
ATTORNEYS Patented Sept. 19, 1933

1,927,579

UNITED STATES PATENT OFFICE 1,927,579

WHEEL COMBINATION FELLOE AND SPACER RING

George Walther, Dayton, Ohio, assignor to The Dayton Steel Foundry Company, Dayton, Ohio, a corporation of Ohio Original application January 21, 1929, Serial No. 333,779. Divided and this application March 6, 1930. Serial No. 433,526

7 Claims. (Cl. 301—12)

My invention relates to wheels and is a division of my application, Serial No. 333,779, filed January 21, 1929.

It is the object of my invention to provide a wheel adapted to support either single or dual pneumatic rims for tires.

It is a further object to provide rim retaining clamping lugs of the same form, size and shape adaptable for use with either dual or single pneumatic rims.

Referring to the drawings:

Figure 1 is a front elevation of a segment of one form of my wheel with a single rim mounted;

Figure 2 is a similar view with the dual rim mounted;

Figure 3 is a section on the line 3—3 of Figure 1;

Figure 4 is a section on the line 4—4 of Figure 2;

Figure 5 is a front elevation of a segment of a modified form of my wheel employing a single rim;

Figure 6 is a view of a segment of the same wheel with the same clamping ring used for mounting dual rims;

Figure 7 is a section on the line 7—7 of Figure 5;

Figure 8 is a section on the line 8—8 of Figure 6.

Referring to the drawings in detail, 1 is a hub and 2 indicates spokes.

It will be understood that if the spokes are made with a cast rim they will be made of cast steel, whereas if they are made of malleable iron, the hub and spokes will have free ends as it is not feasible to cast a wheel of malleable iron having an integral felloe rim.

In the embodiment shown, the inboard wall of the outer end of each spoke is projected radially outward in a straight line, as at 3, to receive a bolt 4 whose head 5 engages the outside of the spoke wall 3. The outer end of this spoke wall 3 is turned over laterally inwardly towards the vehicle as at 6 and is arranged with a flat outer surface 7 and a tapered surface 8.

On the outboard side of the wheel the spoke end is turned laterally outwardly as at 9 and thence radially outward as at 10. On the outboard side of the wheel near its periphery is a shoulder 11 having a tapered surface 12. The bolt 4 passes through the portion or wall 10. The periphery of this wall is provided with a tapered surface 13 and a flat surface 14. Mounted upon the tapered surfaces 12 and 13 are correspondingly tapered surfaces 15 and 16 of a wedge ring which consists of a vertical portion 17 mounted on the bolt 4 and diagonally disposed portions a radially inner one 18 and a radially outer one 19. The tapered surface 15 of the diagonal portion 18 of the wedge ring, when a single rim in place on the wheel, rests upon the tapered surface 12 of the spoke while its tapered surface 20 supports a ring lug which has a correspondingly tapered surface. The ring lug itself is designated 21. The upper edge of this ring lug 21 engages the outside of a tire rim 22 as at 23. This tire rim has a marginally disposed radially extending shoulder, the outboard face of which is designated 23 and the inboard tapered face of which is designated 24. This inboard tapered face rests upon the correspondingly tapered face 25 of the diagonally disposed portion 19 of the wedge ring.

When it is desired to mount two tires and two tire rims on this spoke, the arrangement is as shown in Figure 4 or Figure 8 depending upon the exact modification.

The two rims are arranged with their rim shoulders facing each other towards the center of the wheel.

It will be noted that the spoke ends 7 and 14 are of different radial lengths, the greater length being on the inboard side of the wheel. Thus, the surface 8 of the spoke end wall engages surface 24 of the inboard tire rim. The flat upper surface 14 of the spoke end will support the spacer ring 26 whose upstanding side walls 27 and 28 respectively engage the surfaces 23 of the tire rim shoulders.

The wedge ring has been reversed in position so that the portion 18 now engages the surface 12 of the spoke ends.

The portion 19 now engages the surface 24 of the tire rim. The bolt 4 is arranged to pass through the spoke ends and the wedge ring in the usual manner.

Thus, the same spokes, tire rims and wedge ring may be employed for either single or dual pneumatic wheels.

A slight modification of this general principle of construction is shown in Figures 5, 6, 7 and 8 where we have the spokes 2 provided with a radially outwardly extending inboard side wall 3 with a laterally inwardly turned edge 6 having a flat upper surface 7 and a tapered surface 8. The wall 3 supports the bolt 4 in the usual manner.

The outboard side of the spoke is provided with a radially outwardly extending wall 10 and with a depending shoulder face 12a of the shoulder 11a which is arranged in a slightly different position in this modification. The upper portion of the wall 10 is flat as at 14a and has no tapered surface ordinarily although this may be provided, if desired.

A bolt 4 carries a rim lug 29, the laterally extending portion of which engages with the face 12a on the shoulder 11a. Its upper edge as at 30 engages the face 23 of the tire rim while the inside tapered shoulder face 24 of the tire rim engages a corresponding tapered surface 25 of the wedge ring 31. This wedge ring is mounted on the bolt 4. The wedge ring is also provided with another oppositely correspondingly tapered face 32 and a lower wedging face 33 that rests on the top face 14a of the spoke.

When it is desired to use the dual rims, as in Figure 8, the surface 32 of the wedge ring 31 is used to engage the surface 24 of the outboard rim while the inside surface 23 of this rim is engaged by the spacer ring 26 through the shoulder 28 while the shoulder 27 of the spacer ring engages the outside face of the inboard tire rim which now rides upon the face 8 of the spoke. This spacer ring 26 may be provided with a struck-up series of lugs 34 which depend into the slots 35 of the spoke. When the two rims are used, it is unnecessary to use the ring lug 29.

It will be understood that I desire to comprehend within my invention such modifications as may be necessary to adapt it to varying conditions and uses.

Having thus fully described my invention, what I claim as new and desire to secure by Letters Patent, is:

1. In a wheel, a hub and a plurality of spokes, each of the spokes having spaced walls on the end thereof with tapered surfaces of different heights facing laterally outwardly and a shoulder mounted radially inwardly of the tapered surface on the outboard wall of each spoke, and a supporting surface on the end of the outboard wall of each spoke for supporting a spacer ring, an interchangeable reversible wedge ring and a bolt for supporting said wedge ring carried in the end of each of said spokes whereby said wedge ring in one position is adapted to space a single rim from the spoke ends and the other position is adapted to clamp dual rims and a spacer ring adapted to fit on the spoke ends between the rim when dual rims are used.

2. A vehicle wheel construction comprising a wheel body adapted to support a single tire carrying rim substantially centrally of the wheel body or a pair of tire carrying rims, one on each side of the center of the wheel body, said wheel body having inboard and outboard members having tire rim supporting surfaces, a spacer ring to be used when mounting a pair of tire carrying rims on said wheel body, said spacer ring adapted to abut said inboard and outboard rims on each side of the center of the wheel body when a pair of rims are used, and a reversible wedge ring adapted to be mounted on the outboard surface of the wheel body when mounting a single rim, said wedge ring being reversed when a pair of rims is mounted on said wheel body, and means for attaching said wedge ring to the wheel body.

3. A vehicle wheel construction comprising a wheel body adapted to support a single tire carrying rim substantially centrally of the wheel body or a pair of tire carrying rims, one on each side of the center of the wheel body, said wheel body having inclined inboard and outboard surfaces facing axially outwardly, a spacer ring to be used when mounting a pair of tire carrying rims on said wheel body, said spacer ring abutting said inboard and outboard rims on each side of the center of the wheel body when a pair of rims are used, and a reversible wedge ring mounted on the outboard surface of the wheel body when mounting a single rim, said wedge ring being reversed when a pair of rims is mounted on said wheel body and means for attaching said wedge ring to the wheel body.

4. A vehicle wheel construction comprising a wheel body adapted to support a single tire carrying rim substantially centrally of the wheel body or a pair of tire carrying rims, one on each side of the center of the wheel body, said wheel body having inboard and outboard surfaces, a spacer ring to be used when mounting a pair of tire carrying rims on said wheel body, said spacer ring abutting said inboard and outboard rims on each side of the center of the wheel body when a pair of rims are used, and a reversible wedge ring mounted on the outboard surface of the wheel body when mounting a single rim, and means for attaching the wedge ring to the wheel body said wedge ring being reversed when a pair of rims is mounted on said wheel body, said wedge ring having a surface for directly supporting a tire carrying rim when mounting one or a plurality of rims on said wheel body.

5. A vehicle wheel construction comprising a wheel body adapted to support a single tire carrying rim substantially centrally of the wheel body or a pair of tire carrying rims, one on each side of the center of the wheel body, said wheel body having inboard and outboard members having tire rim supporting surfaces, a spacer ring mounted on said outboard member to be used when mounting a pair of tire carrying rims on said wheel body, said spacer ring adapted to abut said inboard and outboard rims on each side of the center of the wheel body when a pair of rims are used, and a reversible wedge ring adapted to be mounted on the outboard surface of the wheel body when mounting a single rim, said wedge ring being reversed when a pair of rims is mounted on said wheel body and means for attaching said wedge ring to the wheel body.

6. A vehicle wheel construction comprising a wheel body adapted to support a single tire carrying rim substantially centrally of the wheel body or a pair of tire carrying rims, one on each side of the center of the wheel body, said wheel body having inboard and outboard members having tire rim supporting surfaces, a spacer ring to be used when mounting a pair of tire carrying rims on said wheel body, said spacer ring adapted to abut said inboard and outboard rims on each side of the center of the wheel body when a pair of rims are used, and a reversible wedge ring adapted to be mounted on the outboard surface of the wheel body when mounting a single rim, said wedge ring being reversed when a pair of rims is mounted on said wheel body, said wedge ring having an inclined rim supporting surface, and means for attaching said wedge ring to the wheel body.

7. A vehicle wheel construction comprising a wheel body adapted to support a single tire carrying rim substantially centrally of the wheel body or a pair of tire carrying rims, one on each side of the center of the wheel body, said wheel body having inboard and outboard members having tire rim supporting surfaces, a spacer ring to be used when mounting a pair of tire carrying rims on said wheel body, said spacer ring adapted to abut said inboard and outboard rims on each side of the center of the wheel body when a pair of rims are used, and a reversible wedge ring adapted to be mounted on the outboard surface of the wheel body when mounting a single rim, said wedge ring being reversed when a pair of rims is mounted on said wheel body, and means for attaching said wedge ring to the wheel body, said wedge ring having a radial flange.

GEORGE WALTHER.